(12) United States Patent
Ha et al.

(10) Patent No.: US 12,066,186 B2
(45) Date of Patent: Aug. 20, 2024

(54) CONTROL METHOD OF GAS FURNACE

(71) Applicant: LG ELECTRONICS INC., Seoul (KR)

(72) Inventors: Doyong Ha, Seoul (KR); Yongki Jeong, Seoul (KR); Janghee Park, Seoul (KR); Jusu Kim, Seoul (KR); Hansaem Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 672 days.

(21) Appl. No.: 17/273,795

(22) PCT Filed: Sep. 10, 2019

(86) PCT No.: PCT/KR2019/011729
§ 371 (c)(1),
(2) Date: Mar. 5, 2021

(87) PCT Pub. No.: WO2020/055103
PCT Pub. Date: Mar. 19, 2020

(65) Prior Publication Data
US 2021/0199292 A1  Jul. 1, 2021

(30) Foreign Application Priority Data
Sep. 10, 2018 (KR) .......... 10-2018-0107829

(51) Int. Cl.
*F23N 5/24* (2006.01)
*F24H 9/20* (2022.01)
(Continued)

(52) U.S. Cl.
CPC .............. *F23N 5/245* (2013.01); *F24H 9/20* (2013.01); *F24H 15/254* (2022.01); *F24H 15/31* (2022.01);
(Continued)

(58) Field of Classification Search
CPC .......... F23N 5/022; F23N 1/022; F23N 5/102; F23N 5/245; F23N 2900/01001;
(Continued)

(56) References Cited

U.S. PATENT DOCUMENTS

2017/0176024 A1*  6/2017  Park ................... F24D 19/1084
2018/0187923 A1   7/2018  Everly et al.

FOREIGN PATENT DOCUMENTS

JP        2003-302067     10/2003
KR   10-2000-0026736       5/2000
(Continued)

OTHER PUBLICATIONS

International Search Report dated Jan. 7, 2020 issued in Application No. PCT/KR2019/011729.
(Continued)

*Primary Examiner* — Alfred Basichas
(74) *Attorney, Agent, or Firm* — KED & ASSOCIATES

(57) ABSTRACT

A method for controlling a gas furnace including measuring an indoor temperature, comparing the indoor temperature with a set temperature for heating, and operating the gas furnace in weak heating with a predetermined heating capacity, which is lower than a maximum heating capacity of the gas furnace, when the set temperature for heating is higher than the indoor temperature by a temperature value, which is less than a predetermined temperature value. The predetermined heating capacity for weak heating is maintained at a current heating capacity for weak heating, when the gas furnace operates in weak heating, and when an operating duration with the current heating capacity for weak heating is less than a first time value.

7 Claims, 4 Drawing Sheets

(51) Int. Cl.
*F24H 15/254* (2022.01)
*F24H 15/31* (2022.01)
*F24H 15/281* (2022.01)
*F24H 15/395* (2022.01)
*F24H 15/414* (2022.01)

(52) U.S. Cl.
CPC ...... *F23N 2223/08* (2020.01); *F23N 2237/06* (2020.01); *F23N 2237/10* (2020.01); *F23N 2239/04* (2020.01); *F23N 2241/02* (2020.01); *F23N 2900/01001* (2013.01); *F24H 15/281* (2022.01); *F24H 15/395* (2022.01); *F24H 15/414* (2022.01)

(58) Field of Classification Search
CPC ............. F23N 2237/06; F23N 2241/02; F23N 2239/04; F23N 2223/08; F23N 2237/10; F24H 9/20; F24H 15/31; F24H 15/254; F24H 15/281; F24H 15/414; F24H 15/395; G05D 23/30; G05D 23/19
See application file for complete search history.

(56) References Cited

FOREIGN PATENT DOCUMENTS

| KR | 10-0556771 | 3/2006 |
| KR | 10-2006-0097454 | 9/2006 |
| KR | 10-2017-0074521 | 6/2017 |

OTHER PUBLICATIONS

Korean Office Action issued in Application No. 10-2018-0107829 dated Jan. 19, 2023.

\* cited by examiner

CONTROL METHOD OF GAS FURNACE

CROSS-REFERENCE TO RELATED PATENT APPLICATIONS

This application is a U.S. National Stage Application under 35 U.S.C. § 371 of PCT Application No. PCT/KR2019/011729, filed Sep. 10, 2019, which claims priority to Korean Patent Application No. 10-2018-0107829, filed Sep. 10, 2018, whose entire disclosures are hereby incorporated by reference.

TECHNICAL FIELD

The present disclosure relates to a control method of a gas furnace, more specifically, the present disclosure relates to the control method of the gas furnace capable of reaching and maintaining an indoor temperature at a set temperature for heating.

BACKGROUND ART

Generally, a gas furnace is a device for heating indoor air by performing heat exchange between air, supplied indoors, and flame and high-temperature combustion gas which are produced during combustion of a fuel gas.

There is a necessity of controlling the heating capacity of the gas furnace to maintain the indoor temperature close to the set temperature for heating.

The control method of the gas furnace according to the prior art could not regulate the heating capacity of gas furnace depending on the current load, and thus it was difficult to maintain the indoor temperature close to the set temperature.

To solve this problem, the gas furnace was operated with a plurality of predetermined heating capacities, but the heating capacity of gas furnace was not actively adjusted depending on the current load, so it was difficult to cope with various heating loads.

In addition, since the heating capacity of gas furnace is not adjusted depending on the current load, there was a problem that more fuel gas is consumed than required.

DISCLOSURE

Technical Problem

A problem to be solved by the present disclosure is to provide a method controlling the heating capacity for gas furnace capable of actively regulating the heating capacity of gas furnace depending on the current load.

The problems of the present invention are not limited to the problems mentioned above, and other problems that are not mentioned will be clearly understood by those skilled in the art from the following description.

Technical Solution

To solve above problem, the control method of the gas furnace includes a step for measuring an indoor temperature; a step for comparing the indoor temperature with a set temperature for heating; and a step for operating the gas furnace in weak heating with a predetermined heating capacity which is lower than a maximum heating capacity of the gas furnace, when the set temperature for heating is higher than the indoor temperature by a temperature value which is less than a predetermined temperature value, wherein the predetermined heating capacity for weak heating may be maintained at a current heating capacity for weak heating, when the gas furnace operates in weak heating, and when an operating duration with the current heating capacity for weak heating is less than a first time value.

The predetermined heating capacity for weak heating may be increased value by a first capacity value from the current heating capacity for weak heating, when the gas furnace operates in weak heating, and when the operating duration with the current heating capacity for weak heating is less than the first time value.

The predetermined heating capacity for weak heating may become a predetermined capacity at the beginning of weak heating, when the gas furnace is not in weak heating operation, and when a time that the weak heating operation has stopped is greater than a second time value.

The predetermined heating capacity for weak heating is decreased value by a second capacity value from a final weak heating capacity in a previous weak heating operation, when the gas furnace is not in weak heating operation, when the time that the weak heating operation has stopped is the second time value or less, and when the final weak heating capacity in a previous weak heating operation is less than a third time value.

The predetermined heating capacity for weak heating may become the final weak heating capacity in the previous weak heating operation, when the gas furnace is not in weak heating operation, when the time that the weak heating operation has stopped is the second time value or less, and when the final weak heating capacity in a previous weak heating operation is the third time value or more.

The control method of the gas furnace may further comprise a step for operating the gas furnace in strong heating with the maximum heating capacity, when the set temperature for heating is higher than the indoor temperature by the predetermined temperature value or more.

Advantageous Effects

The gas furnace according to the present disclosure has one or more of the following effects.

By calculating the heating capacity, step by step, according to the operation state and operation duration of the gas furnace, the gas furnace is operated with the heating capacity suitable for the current load, so it is possible to easily maintain the indoor air temperature close to the heating set temperature.

BEST MODE FOR INVENTION

Figure 1:
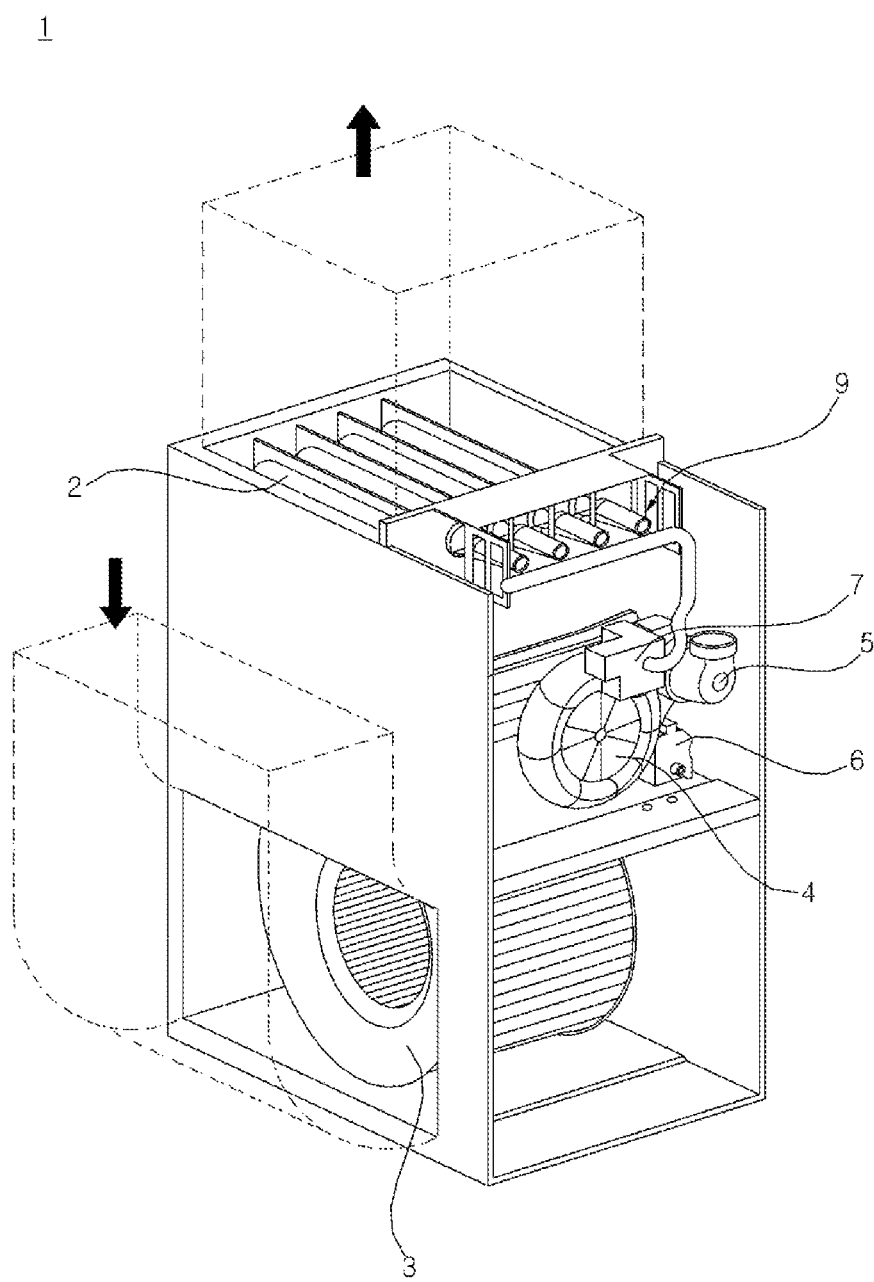
FIG. 1 is a perspective view of the gas furnace to which the control method of the present disclosure is applied.

Hereinafter, exemplary embodiments disclosed in the present specification will be described in detail with reference to the accompanying drawings. Regardless of the reference numerals, the same or similar components are used with the same reference numerals, and redundant descriptions thereof will be omitted. The suffixes "Module" and "Unit" for components used in the following description are used or mixed for ease of writing the specification. "Module" and "Unit" do not have different meaning or function. In addition, in describing the embodiment disclosed in the present specification, when it is determined that a detailed description of the prior art may cloud the gist of the embodiment disclosed in the present specification, a detailed description of the prior art will be omitted. In addition, the drawings are only for making it easier to understand the embodiments disclosed in the present specification, and the technical idea disclosed in the present specification is not limited by the attached drawings. Herein disclosed the technical idea is intended to cover all modifications, equivalents, and substitutes included in the idea and scope of the present disclosure.

The terms including ordinal numbers such as first, second, etc. may be used to describe various elements, but these elements are not limited by these terms. These terms are only used to distinguish one element from another.

When an element is referred to as "connected" to another element, it may be directly connected to the other component, but another component may exist therebetween. On the other hand, when it is referred to as "directly connected" to another component, it should be understood that there is no other component therebetween.

The expression in the singular form includes the meaning of the plural unless the context clearly indicates.

In the present application, terms such as "comprise" or "have" merely indicate the existence of features, numbers, steps, actions, components, parts, or combinations thereof described in the specification. That is, it should be understood that the possibility of the presence or addition, of one or more other features, numbers, steps, actions, components, parts, or combinations thereof, is not excluded.

FIG. 1 is a perspective view of the gas furnace to which the control method of the present disclosure is applied.

Referring to FIG. 1, the explanation of the gas furnace, according to the present disclosure, follows below.

The gas furnace 1 is a device for heating indoor air by performing heat exchange between air, supplied indoors, and flame and high-temperature combustion gas P which are produced during combustion of a fuel gas R.

As illustrated in FIG. 1, the gas furnace 1 includes a burner 9 in which the combustion gas P is produced by combustion of fuel gas R, a heat exchanger 2 having a gas flow path through which the combustion gas P flows, and a blower 3 and an inducer 4 which are used for the gas furnace.

A flame and the combustion gas P may be produced by the combustion, in the burner 9 or a venturi tube, of the fuel gas R. Generally, as the fuel gas R, Liquefied Natural Gas (LNG) may be generally used, which is natural gas that has been cooled down to liquid form, or Liquefied Petroleum Gas (LPG) may be generally used, which is a by-product of crude oil refining and is pressurized into liquid form.

The fuel gas R may be sprayed to the venturi tube (no reference numeral), through a nozzle (not shown), by being injected into a manifold (no reference numeral) from a gas tank 7.

A gas pipe (no reference numeral) may be disposed between the gas tank 7 and the manifold. The gas tank 7 may be connected with the manifold via the gas pipe.

A gas valve 8 may be disposed at a connecting part of the gas tank 7 and the gas pipe. The gas valve 8 may open or may close, in whole or in part, an inside of the gas pipe.

That is, the gas valve 8 may control the heating power by regulating the volume, flowing into the manifold, of the fuel gas R.

By inducing the air, which would be supplied to the indoor space, to flow around the heat exchanger 2 where the flame and the combustion gas P flows, the indoor air may be heated.

The heat exchanger 2 may be composed of a primary heat exchanger and a secondary heat exchanger.

One side of the primary heat exchanger may be disposed to be adjacent to the burner 9. The other side opposed to the one side of the primary heat exchanger may be coupled to a coupling box (not shown). The combustion gas P, flowing from the one side of the primary heat exchanger to the other side thereof, may be conveyed to the secondary heat exchanger through the coupling box.

One side of the secondary heat exchanger may be connected to the coupling box. The combustion gas P, after passing through the primary heat exchanger, may pass through the secondary heat exchanger via the one side of the secondary heat exchanger.

The secondary heat exchanger may exchange heat again between air flowing around the secondary heat exchanger, and the combustion gas P after passing through the primary heat exchanger.

That is, since thermal energy of the combustion gas P, after passing through the primary heat exchanger, is used additionally by the secondary heat exchanger, efficiency of the gas furnace 1 may be enhanced.

The combustion gas P, after passing through the secondary heat exchanger, may condense by exchanging heat with air flowing around the secondary heat exchanger and may form condensate. In other words, vapor in the combustion gas P may change phase into the condensate by condensation.

By this reason, the gas furnace 1 having the primary heat exchanger and the secondary heat exchanger is referred to as condensing gas furnace.

The condensate formed in this case may be collected into a condensate collector (no reference numeral). For this, the other side, opposed to the one side of the secondary heat exchanger, may be connected to one side of the condensate collector.

The inducer 4 may be coupled to the other side of the condensate collector. Hereinafter, the inducer 4 is coupled to the condensate collector for simple explanation, but the inducer 4 may be coupled to a mounting plate which is coupled to the condensate collector.

An opening may be formed at the condensate collector. The other side of the secondary heat exchanger may communicate with the inducer 4 through the opening formed at the condensate collector.

That is, the combustion gas P, after passing through the other side of the secondary heat exchanger, flows into the inducer 4 through the opening formed at the condensate collector. The air flowing into the inducer 4 may discharged, through an exhaust pipe 5, to an outside of the gas furnace 1.

The condensate formed in the secondary heat exchanger flows into a condensate trap 6 through the condensate collector. The air flowing into the condensate trap 6 may be discharged, through an outlet, to the outside of the gas furnace 1.

In this case, the condensate trap 6 may be coupled to the other side of the condensate collector. The condensate trap 6 may collect and discharge the condensate formed in the secondary heat exchanger, and condensate formed in the exhaust pipe 5.

That is, when the combustion gas P, that do not condense yet at the other side of the secondary heat exchanger, condense while passing through the exhaust pipe 5, the condensate formed in the exhaust pipe 5 may be collected to the condensate trap 6 and then may be discharged, through the outlet, to the outside of the gas furnace 1.

The inducer 4 may communicate with the other side of the secondary heat exchanger through the opening formed in the condensate collector.

One side of the inducer 4 may be coupled to the other side of the condensate collector. Other side of the inducer 4 may be coupled to the exhaust pipe 5.

The inducer may induce the combustion gas P to pass through the primary heat exchanger, the coupling box and the secondary heat exchanger and then to be discharged through the exhaust pipe 5. In this regard, the inducer 4 may be understood as induced draft motor (IDM).

The blower 3 may be positioned at a lower side of the gas furnace 1. The air supplied to the indoor space may flows, by the blower 3, from a bottom to a top of the gas furnace 1. In this regard, the blower 3 for the gas furnace may be understood as indoor blower motor (IBM).

The blower 3 may induce air to flow around the heat exchanger 2.

The temperature of the air, flowing around the heat exchanger 2 by the blower 3, may rise by thermal energy from the combustion gas P in the heat exchanger 2. Since the air with risen temperature is supplied to the indoor space, the indoor space may be heated.

The gas furnace 1 may include a case (no reference numeral). The elements, described above, of the gas furnace 1 may be accommodated inside the case. A lower side opening may be formed at a lower side, of the case, adjacent to the blower 3. The air, flowing around the heat exchanger 2, may flow into an inside of the case through the lower side opening.

An opening for the exhaust pipe (no reference numeral) may be formed at an upper side of the case, but position thereof is not limited thereto.

An upper side opening (no reference numeral) may be formed at the upper side, adjacent to an upper side of the heat exchanger 2, of the case. Heated air by flowing around the heat exchanger 2 may be discharged, through the upper side opening, to an outside of the case and them may be supplied to the indoor space.

A duct (no reference numeral) communicating an indoor space, which is target space for heating, with the gas furnace 1 may be installed at the lower side opening and the upper side opening.

A filter, for filtering foreign matter like dust in air, may be installed between the lower side opening and the duct installed thereat.

As described above, since the secondary heat exchanger is an element additionally using the thermal energy of the combustion gas P that has passed through the primary heat exchanger, it may be understood easily that the efficiency of the gas furnace having the primary heat exchanger and the secondary heat exchanger is excellent compared with the gas furnace only having the primary heat exchanger.

The control method of the gas furnace according to the present disclosure may be applied not only to the gas furnace having the primary heat exchanger but also to the gas furnace having the primary heat exchanger and the secondary heat exchanger.

As described above, the heating power of the gas furnace 1 may be controlled by using the gas valve 8. Hereinafter, the heating power of the gas furnace 1 may be referred to as heating capacity.

In this case, without considering a difference of the indoor temperature and the set temperature for heating, when the gas furnace 1 operates with a predetermined heating capacity, overshooting which means the indoor temperature far exceeds the set temperature for heating may frequently occur.

In addition, when the heating capacity of the gas furnace 1 is calculated at an amount, needed to increase the indoor temperature to the set temperature for heating, or more, there may be a problem that the consumption of the fuel gas R may increase more than the needed amount.

The present disclosure is invented to solve above problem.

Hereinafter, the control method of the gas furnace according to the present disclosure will be described specifically.

Figure 2:
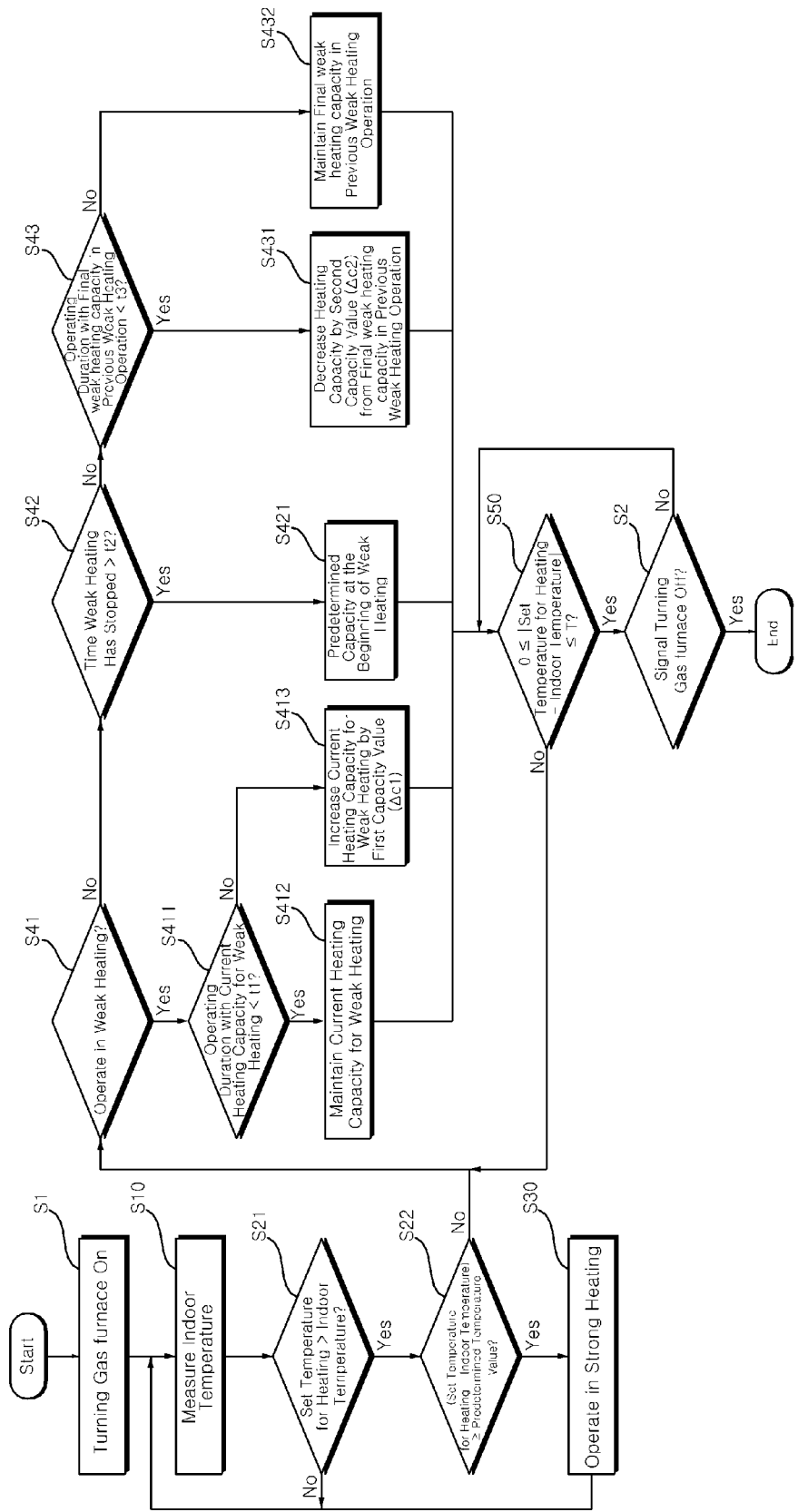
FIG. 2 is a flow chart of the control method of the gas furnace according to the present disclosure.
Figure 3:
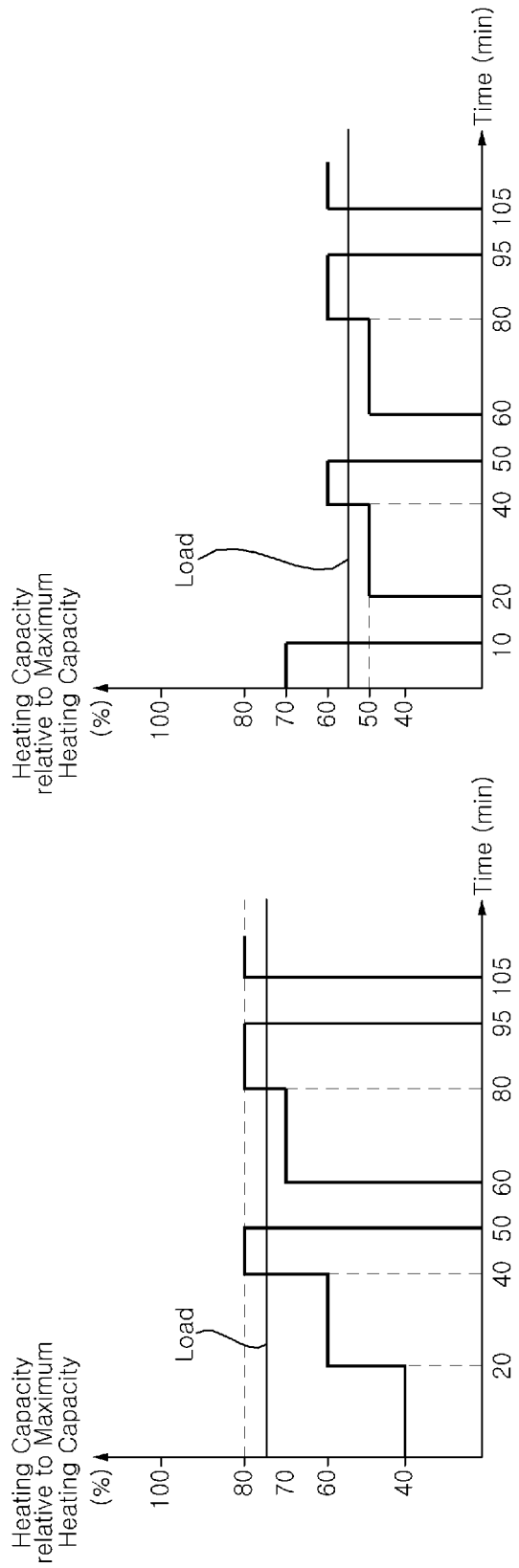
FIGS. 3A and 3B are views illustrating one example of method, according to the present disclosure, calculating the heating capacity for the weak heating.
Figure 4:
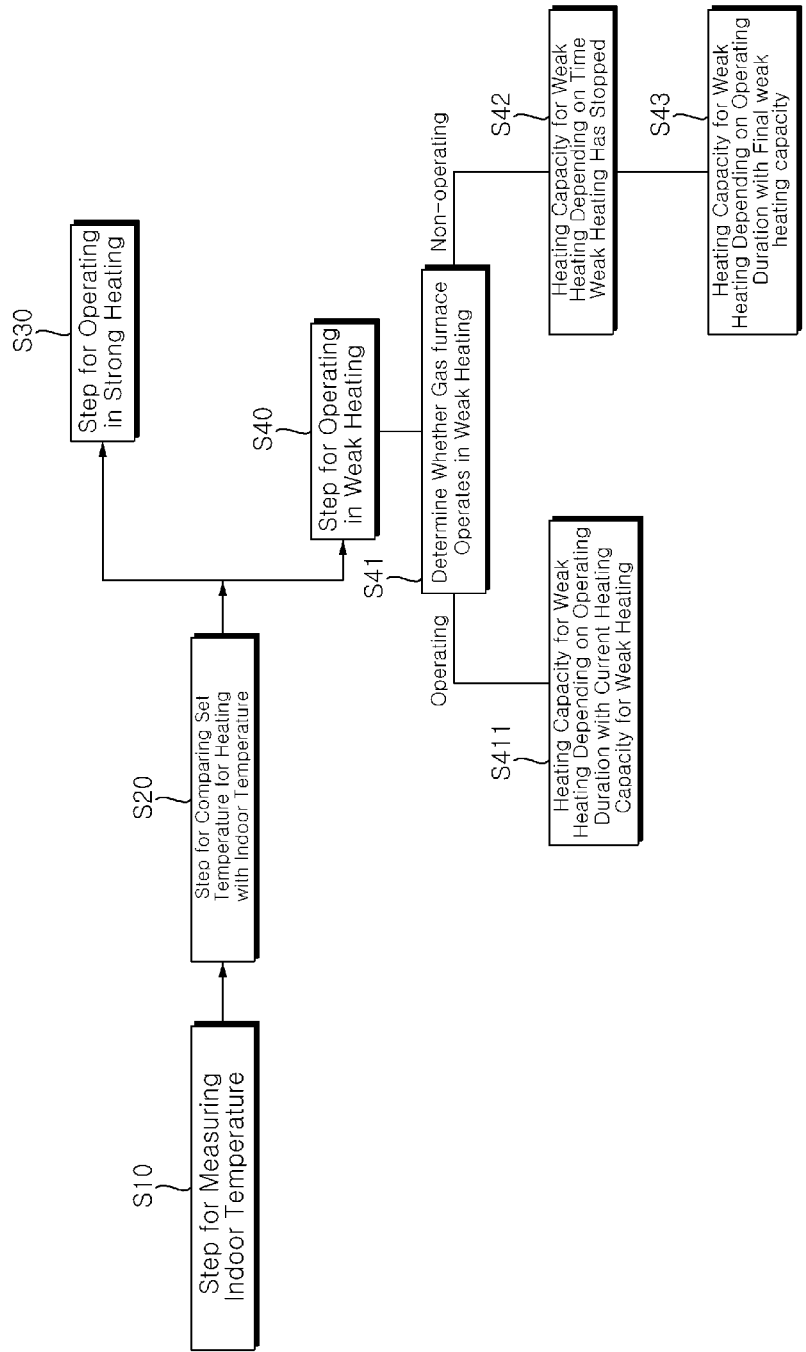
FIG. 4 is a configuration view of the heating capacity control of the gas furnace according to the present disclosure.

FIG. 2 is a flow chart of the control method of the gas furnace according to the present disclosure. FIG. 3 is a view illustrating one example of method, according to the present disclosure, calculating the heating capacity for the weak heating. FIG. 4 is a configuration view of the heating capacity control of gas furnace according to the present disclosure.

As illustrated in FIGS. 2 and 4, the control method of the gas furnace according to the present disclosure includes a step S10 for measuring the indoor temperature, a step S20 for comparing the set temperature for heating with the indoor temperature, and a step S40 for operating the gas furnace in the weak heating.

Including above steps, each step composing the control method of the gas furnace according to the present disclosure may be performed by a control unit.

The control unit may be embodied by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and other electrical units to function.

The controller may be connected electrically to devices used for each step composing the control method of the gas furnace according to the present disclosure.

For example, regarding a step S21 and a step S22 described later, the control unit may receive information about the indoor temperature Tr by being electrically connected with a thermocouple, described later. The control unit may receive information about the set temperature Td for heating by being electrically connected with a thermostat, described later.

By this, the controller may compare the indoor temperature Tr with the set temperature Td for heating. The controller may perform the steps S21 and S22. The rest of steps may be performed by the controller above.

The control method of the gas furnace, described hereinafter, is carried out after a step S1 for turning the power of the gas furnace 1 on.

When the power of the gas furnace 1 is turned on, the gas furnace 1 may be operating or may not be operating.

Here, when the gas furnace 1 is in operation, it is a case that the fuel gas R flows into the manifold and the venturi tube to increase the indoor temperature Tr to the set temperature Td for heating and then burned to generate the flame and high-temperature combustion gas P.

On the contrary, when the gas furnace 1 is not in operation, it is a case that the gas valve 8 blocks an inflow, into the manifold and the venturi tube, of the fuel gas R to prevent the indoor temperature Tr from being higher than the set temperature Td for heating.

The step S10 for measuring the indoor temperature may be step for measuring temperature of the indoor air which is a target heated. The step S10 for measuring the indoor temperature may be step for measuring temperature of the indoor air, which is a target heated, by using a thermocouple embedded in a thermostat.

Here, the thermostat may be a device showing the indoor temperature Tr to the consumer. The thermostat may be a device that the consumer enters the set temperature Td for heating.

In addition, the thermocouple may be a device where thermoelectromotive force is generated depending on the indoor temperature Tr. The thermocouple is a device using the seebeck effect.

Here, the seebeck effect is described as the effect that thermoelectric force is generated in proportion to the temperature difference between two contact points when two different kinds of metal are in contact.

The metals used for the thermocouple are platinum-platinum rhodium, chromel-alumel, iron-constantan, copper-constantan, etc.

When one of the two contact points is a reference point and the other is a measuring point, and when a region where the temperature thereof is measured is positioned on the measuring point, the temperature difference between the reference point and the measuring point may be known, and then temperature of the region may be measured by being compared with the temperature of the reference point.

In the present disclosure, the indoor temperature Tr may be measured by using the principle of thermocouple. The user may recognize the indoor temperature Tr by a display unit, displaying the indoor temperature Tr, of the thermostat.

The user may enter the set temperature Td for heating, the user wishes, to the thermostat considering the indoor temperature Tr. That is, after the step S10 for measuring the indoor temperature, a step for receiving and saving the set temperature, entered by the user, for heating.

The step S20, for comparing the set temperature for heating with the indoor temperature, may be the step in which the indoor temperature Tr measured in the step S10, for measuring the indoor temperature, is compared with the set temperature Td for heating input by the user.

The step S20, for comparing the set temperature for heating with the indoor temperature, may include the step S21 for determining whether the set temperature Td for heating is higher than the indoor temperature Tr, and the step S22, for determining whether the set temperature Td for heating is higher than the indoor temperature Tr by a predetermined temperature value.

In the step S21, since the operation of the gas furnace 1 is unnecessary when the set temperature Td for heating is below the indoor temperature Tr, it may return to the step S10.

In the step S21, when it is determined that the set temperature Td for heating is higher than the indoor temperature Tr, the step S22 may be performed.

In the step S22, when the set temperature Td for heating is higher than the indoor temperature Tr by the predetermined temperature value or more, a step S30 for operating the gas furnace in strong heating may be performed.

The step S30 for operating the gas furnace in strong heating may be the step for operating the gas furnace with maximum heating capacity. Here, the maximum heating capacity means the heating power when the fuel gas R flows into the manifold to the maximum amount, by fully opening the gas valve 8.

Since the difference, between the indoor temperature Tr and the set temperature Td for heating, gradually becomes small as the step S30 is performed, over time, the difference between the set temperature Td for heating and the indoor temperature Tr may be less than the predetermined temperature value.

As illustrated in FIG. 2, in the step S30, the gas furnace may operate in strong heating or in the weak heating, described later, depending on the temperature difference, between the set temperature Td for heating and the indoor temperature Tr, by being returned to the step S10.

In the above, it has been described that the step S30 for operating the gas furnace in strong heating is performed before the step S40 for operating the gas furnace in the weak heating. However, if the initial state is a state that the set temperature for heating is higher than the indoor temperature by a temperature value which is less than the predetermined temperature value, the step S40 for operating the gas furnace in the weak heating may be performed without performing the step S30 for operating the gas furnace in strong heating.

In the step S22, when the set temperature Td for heating is higher than the indoor temperature Tr by a temperature value which is less than the predetermined temperature value, the step S40 for operating the gas furnace in the weak heating may be performed.

The step S40 for operating the gas furnace 1 in the weak heating may be the step for operating the gas furnace 1 with a predetermined heating capacity for the weak heating which is less than the maximum heating capacity of the gas furnace 1. Here, the predetermined heating capacity, for the weak heating, means the heating power when the fuel gas R flows into the manifold below the maximum amount by partially closing the gas valve 8.

That is, when the difference between the indoor temperature Tr and the set temperature Td for heating becomes less than the predetermined temperature value, it is possible to prevent the indoor temperature Tr from significantly exceeding the heating set temperature Td, by lowering the heating capacity of the gas furnace 1 than the maximum heating capacity.

The predetermined heating capacity for the weak heating may be determined through a step S41 for determining whether the gas furnace 1 is operating in the weak heating.

When an operating duration, in the weak heating, with a current heating capacity in the weak heating, of the gas furnace 1 is less than a first time value t1, the predetermined heating capacity for the weak heating may be maintained as the current heating capacity for the weak heating S412.

For example, as illustrated in (a) of FIG. 3, in a section from 0 to 20 minutes, that is, the section that the operating duration, with 40% of heating capacity to the maximum heating capacity, is less than 20 minutes, the 40% of heating capacity may be maintained.

Above description may be applied to other sections, satisfying above condition, of (a), (b) of FIG. 3.

When the operating duration, in the weak heating, with a current heating capacity in the weak heating, of the gas furnace 1 is more than the first time value t1, the predetermined heating capacity for the weak heating may be increased by a first capacity value $\Delta c1$ from the current heating capacity for the weak heating S413.

That is, when the indoor temperature Tr does not reach the set temperature Td for heating, that is, when does not reach a load in FIG. 3, even though the gas furnace 1 operates in the weak heating for a certain time, it is possible to facilitate that the indoor temperature Tr reaches to the set temperature Td for heating, by increasing the current heating capacity for the weak heating.

For example, as illustrated in (a) of FIG. 3, after operating, in the weak heating, with 40% of heating capacity to the maximum heating capacity, the heating capacity of 20% can be increased to 60% of the heating capacity. The heating capacity may be increased, by 20%, from 40% to 60% to the maximum heating capacity.

This description may also be applied to a point, that satisfies the above condition, reaches 40 minutes in (a) of FIG. 3.

However, the first capacity value $\Delta c1$ may have a different value before and after the direction, of increase or decrease of the heating capacity for the weak heating, is changed. This will be described later.

When the gas furnace 1 is not in the weak heating operation, the predetermined heating capacity for the weak heating may be determined through a step S42 for measuring a time that the weak heating operation has stopped.

When the gas furnace 1 is not in the weak heating operation, and when the time that the weak heating operation has stopped exceeds a second time value t2, the predetermined heating capacity for the weak heating may be a predetermined capacity at the beginning of the weak heating operation S421.

That is, since it is inappropriate to refer to the previous heating capacity for the weak heating when the gas furnace 1 is not in the weak heating operation for a certain time, it is possible to make the indoor temperature Tr to reach the set temperature for heating by gradually regulating the heating capacity from the predetermined capacity at the beginning of the weak heating operation.

For example, when (a) of FIG. 3 shows the heating capacity when the gas furnace 1 operates again in the weak heating after 1 hour from the time when the weak heating operation of the gas furnace 1 has stopped, it can be understood that the predetermined capacity at the beginning of the weak heating operation is 40% of the heating capacity to the maximum heating capacity.

When the time, that the weak heating operation of the gas furnace 1 has stopped, is the second time value or less, the predetermined heating capacity for the weak heating may be determined through a step S43 for measuring the operating duration, in the weak heating, with a final weak heating capacity in the previous weak heating operation.

When the gas furnace 1 is not in the weak heating operation, when the time that the weak heating operation has stopped is the second time value or less, and when the operating duration with the final weak heating capacity in the previous weak heating operation is below a third time value t3, the predetermined weak heating capacity may be reduced S431, from the final weak heating capacity, by a second capacity value $\Delta c2$.

That is, since the fact, that the operating duration at the final weak heating capacity is less than the third time value t3, means that the gas furnace was operated with a heating capacity greater than the heating capacity required to increase the indoor temperature Tr to the set temperature Td for heating, it is preferable that the predetermined heating capacity for weak heating, in the case of the gas furnace operates in the weak heating again, decreases by the second capacity value $\Delta c2$ from the final weak heating capacity S431.

For example, the heating capacity for weak heating, at a time of 60 minutes in (a) of FIG. 3, becomes 70% of maximum heating capacity. This will be described as follows.

The time of 60 minutes in (a) of FIG. 3 is the time that the gas furnace 1 operates again in weak heating when gas furnace 1 is not in weak heating operation.

In this case, since the time that the weak heating operation has stopped is 10 mins, not more than the second time value t2 (For example, 1 hour), and since the operating duration with 80%, which is the final weak heating capacity in the previous weak heating operation, of the maximum heating capacity is 10 mins, less than the third time value t3 (For example, 15 mins), the heating capacity for weak heating at the time of 60 minutes becomes 70% of the maximum heating capacity decreased by the second heating capacity value $\Delta c2$ (For example, 10% of the maximum heating capacity).

This description can also be applied to the time of 60 minutes, that satisfies the above condition, in (b) of FIG. 3.

However, like the first capacity value $\Delta c1$, the second capacity value $\Delta c2$ may have a different value before and after the direction, of increase or decrease of the heating capacity for weak heating, is changed. It will be described specifically later.

When the gas furnace 1 is not in the weak heating operation, when the time that the weak heating operation has stopped is not more than the second time value t2 and when the operating duration with the final weak heating capacity in the previous weak heating operation is more than the third time value t3, the predetermined heating capacity for weak heating may become the final weak heating capacity S432.

That is, since the operating duration, with the final weak heating capacity is more than the third time value t3, means that the gas furnace 1 has operated with the heating capacity required to maintain the indoor temperature Tr at the heating set temperature Td, it is preferable that the predetermined heating capacity for weak heating, when the gas furnace 1 operates again in weak heating, is same with the final weak heating capacity S432.

For example, the heating capacity for weak heating, at a time of 105 mins in (a) of FIG. 3, becomes 80% of the maximum heating capacity. This will be described as follows.

The time of 105 mins in (a) of FIG. 3 is the time that the gas furnace 1 operates again in weak heating after the state of not operating with the weak heating.

In this case, since the time that the weak heating operation has stopped is 10 mins, not more than the second time value t2 (For example, 1 hour), and since the operating duration with 80%, which is the final weak heating capacity in the previous weak heating operation, of the maximum heating capacity is 15 minutes, more than the third time value t3 (For example, 15 mins), the heating capacity for weak heating at the time of 105 minutes becomes 80% of the maximum heating capacity.

This description can also be applied to the time of 105 minutes, that satisfies the above condition, in (b) of FIG. 3.

Hereinafter, the fact, that the first capacity value $\Delta c1$ and the second capacity value $\Delta c2$ are different before and after the direction of change in the heating capacity for weak heating, is described.

As described above, the predetermined heating capacity for weak heating is regulated gradually by above condition (step). Here, a regulation of the heating capacity for weak heating may be sorted by a reaching regulation for regulating the indoor temperature Tr to reach the set temperature Td for heating and a keeping regulation for keeping the indoor temperature Td at the set temperature for heating.

In the reaching regulation, the heating capacity for weak heating changes drastically. In order to quickly reach the indoor temperature Tr to the heating set temperature Td, the first capacity value $\Delta c1$ and the second capacity value $\Delta c2$ may be greater than the first capacity value $\Delta c1$ and the second capacity value $\Delta c2$ in the keeping regulation.

Conversely, in the keeping regulation, the heating capacity for weak heating changes within a narrow range. In order to keep the indoor temperature Tr at the set temperature for heating, the first capacity value $\Delta c1$ and the second capacity value $\Delta c2$ may be lower than the first capacity value $\Delta c1$ and the second capacity value $\Delta c2$ in the reaching regulation.

However, when the time that the weak heating operation has stopped exceeds the second time value t2 (For example, 1 hour), the first capacity value $\Delta c1$ and the second capacity value $\Delta c2$ may be reset to a predetermined initial value.

Referring to FIG. 3, the above contents will be described with an example.

In FIG. 3, the initial value of the first capacity value $\Delta c1$ and the second capacity value $\Delta c2$ is set to 20% of the maximum heating capacity, and is set to 10% of the maximum heating capacity after the direction of increase or decrease of the heating capacity for the weak heating is changed.

In (a) of FIG. 3, the first capacity value $\Delta c1$ is 20% of the maximum heating capacity at the times of 20 minutes and 40 minutes, the second capacity value $\Delta c2$ is 10% at the time of 60 minutes, and the first capacity value $\Delta c1$ is 10% at the time of 80 minutes.

Here, a section from 0 to 50 minutes may be considered as the reaching regulation and a section after 60 minutes may be considered as the keeping regulation. That is, as the direction of increase or decrease of the heating capacity for the weak heating is changed, it may be seen that the first capacity value $\Delta c1$ and the second capacity value $\Delta c2$ have been decreased.

Likewise, at the time of 20 minutes in (b) of FIG. 3, the second heating capacity $\Delta c2$ is 20% of the maximum heating capacity. However, the first heating capacity $\Delta c1$ is 10% at the times of 40 minutes and 80 minutes, and the second heating capacity $\Delta c2$ is 10% at the time of 60 minutes.

Here, a section from 0 to 40 minutes may be considered as the reaching regulation and a section after 40 minutes may be considered as the keeping regulation. That is, as the direction of increase or decrease of the heating capacity for weak heating is changed before and after 40 minutes, it may be seen that the first capacity value $\Delta c1$ and the second capacity value $\Delta c2$ have been decreased.

In addition, after the first capacity value $\Delta c1$ and the second capacity value $\Delta c2$ have been decreased by the change of direction of increase or decrease of the heating capacity for weak heating, although the direction of increase or decrease of the heating capacity for weak heating has changed, it may be seen that the previous first capacity value $\Delta c1$ and second capacity value $\Delta c2$ are maintained. That is, the first capacity values $\Delta c1$, at the times of 40 minutes and 80 minutes in (b) of FIG. 3, are same with 10%.

Meanwhile, the fact that the first capacity value $\Delta c1$ is 20% of the maximum heating capacity at the time of 20 minutes in (a) of FIG. 3 and the fact that the second capacity value $\Delta c2$ is 20% of the maximum heating capacity at the time of 20 minutes in (b) of FIG. 3 may be understood by the fact that the first capacity value $\Delta c1$ and the second capacity value $\Delta c2$ are reset to the initial value because (a), (b) illustrates the heating capacity for weak heating after the time that the weak heating operation has stopped exceeds the second time value t2 (For example, 1 hour).

Above method for regulating the first capacity value $\Delta c1$ and the second capacity value $\Delta c2$ is described as an example, and the control method of the gas furnace according to present disclosure is not limited thereto.

As illustrated in FIG. 2, after the step S40 for operating the gas furnace in the weak heating, a step S50, for determining whether absolute value of the difference of the indoor temperature Tr and the set temperature Td for heating is within a predetermined range, may be included further.

Even after step S40, it is realistically difficult to accurately match the indoor temperature Tr with the set temperature Td for heating. So, the determination of whether the heating target has been achieved may be replaced by determining whether the absolute value of the difference between the heating set temperature Td and the indoor temperature Tr is within the predetermined range S50.

Here, the predetermined range may be the range from 0° C. to T° C. (For example, 1° C.).

In the step S50, when the absolute value of the difference of the indoor temperature Tr and the set temperature Td for heating get out of the predetermined range, the gas furnace 1 may perform continuously in weak heating by returning to the step S41.

In the step S50, when the absolute value of the difference of the indoor temperature Tr and the set temperature Td for heating is within a predetermined range, a step S2 for turning the gas furnace 1 off may be performed.

In the step S2, when the turning the gas furnace 1 off signal is inputted, the gas furnace 1 may be turned off.

In the step S2, when the turning the gas furnace 1 off signal is not inputted, it may be returned to the step S50. In this case, the step, for determining whether the absolute value of the difference between the heating set temperature Td and the indoor temperature Tr is within the predetermined range, is repeated. And, when the absolute value of the difference of the indoor temperature Tr and the set temperature Td for heating get out of the predetermined range, the gas furnace 1 may perform continuously in weak heating by returning to the step S41.

The control method of the gas furnace according to the present disclosure may calculate the heating capacity by considering the difference of the indoor temperature Tr and the set temperature Td for heating and information (operating condition of the gas furnace, operating duration, etc.) of previous heating operation.

In other words, by calculating the heating capacity, corresponding to a current load, in phases, it may be easy to reach and maintain the indoor temperature Tr close to the set temperature Td for heating.

In addition, by calculating the heating capacity corresponding to a current load, it is possible to prevent the fuel gas R from being consumed more than the heating capacity required to reach and maintain the indoor temperature Tr at the set temperature Td for heating. And then the efficiency of the gas furnace 1 may be improved.

The scope of the present disclosure should be determined by reasonable interpretation of the attached claims, and all modifications within the equivalent scope of the present disclosure are included in the scope of the present disclosure.

The invention claimed is:

1. A method for controlling a gas furnace, the method comprising:
   measuring an indoor temperature;
   comparing the indoor temperature with a set temperature for heating; and
   operating the gas furnace in a first heating with a predetermined heating capacity, which is lower than a maximum heating capacity of the gas furnace, when the set temperature for heating is higher than the indoor temperature by a temperature value which is less than a predetermined temperature value, wherein the predetermined heating capacity for the first heating is maintained at a current heating capacity for the first heating, when the gas furnace operates in the first heating, and when an operating duration with the current heating capacity for the first heating is less than a first time value, wherein the predetermined heating capacity for the first heating is increased in value by a first capacity value from the current heating capacity for the first heating, when the gas furnace operates in the first heating, and when an operating duration with the current heating capacity for the first heating is greater than the first time value, wherein the current heating capacity is the heating capacity at which the gas furnace is currently operating, and wherein the first capacity value before a direction of increase or decrease of the predetermined heating capacity is changed is greater than the first capacity value after the direction of increase or decrease of the predetermined heating capacity is changed.

2. The method according to claim 1, wherein the predetermined heating capacity for the first heating becomes a predetermined capacity at the beginning of the first heating, when the gas furnace is not in the first heating, and when a time that the first heating has stopped is greater than a second time value.

3. The method according to claim 2, wherein the predetermined heating capacity for the first heating is decreased in value by a second capacity value from a final first heating capacity in a previous first heating, when the gas furnace is not in the first heating, when the time that the first heating has stopped is the second time value or less, and when the final first heating capacity in a previous first heating is less than a third time value.

4. The method according to claim 3, wherein the second capacity value, before and after the direction of increase or decrease of the predetermined heating capacity for the first heating is changed, are different from each other.

5. The method according to claim 3, wherein the predetermined heating capacity for the first heating becomes the final first heating capacity in the previous first heating, when the gas furnace is not in the first heating, when the time that the first heating has stopped is the second time value or less, and when the final first heating capacity in a previous first heating is the third time value or more.

6. The method according to claim 1, further comprising:
   determining whether an absolute value, of the difference of the indoor temperature and the set temperature for heating, is within a predetermined range.

7. The method according to claim 1, further comprising:
   operating the gas furnace in a second heating with the maximum heating capacity, when the set temperature for heating is higher than the indoor temperature by the predetermined temperature value or more.

* * * * *